United States Patent [19]

Fourneau

[11] 3,930,546
[45] Jan. 6, 1976

[54] WEIGHT GRADING APPARATUS

[76] Inventor: Kevin John Fourneau, 711 Ballantyne St., Hastings, New Zealand

[22] Filed: Oct. 30, 1974

[21] Appl. No.: 519,275

[52] U.S. Cl.................................. 177/168; 177/230
[51] Int. Cl.² ................ G01G 23/14; G01G 23/26
[58] Field of Search ........... 177/168, 169, 170, 227, 177/230, 231

[56] References Cited
UNITED STATES PATENTS

| | | | |
|---|---|---|---|
| 2,228,874 | 1/1941 | Greenleaf | 177/231 X |
| 3,602,325 | 8/1971 | Masstetten et al. | 177/169 |

FOREIGN PATENTS OR APPLICATIONS

| | | | |
|---|---|---|---|
| 167,837 | 3/1934 | Switzerland | 177/231 |

*Primary Examiner*—George H. Miller, Jr.
*Attorney, Agent, or Firm*—Holman & Stern

[57] ABSTRACT

A weight grading apparatus with self-compensating adjustment means to maintain accurate grading over a wide range of ambient temperatures. The apparatus comprises a scale beam, a fulcrum, a weight sensing surface on the scale beam on one side of the fulcrum and a spring engaged at one end with a point on the scale beam on the other side of the fulcrum and with the opposite end of the spring engaged with an adjustment head. The adjustment head is adjustable along a path parallel to the axis of the spring.

4 Claims, 2 Drawing Figures

WEIGHT GRADING APPARATUS

BACKGROUND OF THE INVENTION

1. FIELD OF INVENTION

This invention relates to a weight grading apparatus which is particularly though not solely adapted for use in fruit grading machines.

2. DESCRIPTION OF THE PRIOR ART

Apparatus is currently available for weight grading of fruit but the accuracy of the apparatus is not consistent over a period of time, particularly when changes in ambient temperatures are likely to be experienced in operating conditions. Also, the apparatus is comparatively complex and this tends to increase manufacturing costs.

It is an object of the present invention to provide weight grading apparatus which will minimize the difficulties mentioned above or which will at least provide apparatus offering a useful alternative to apparatus currently available.

SUMMARY OF THE INVENTION

Accordingly, in one aspect the invention may broadly be said to consist in weight grading apparatus including a scale assembly comprising: a fulcrum; a scale beam supported upon said fulcrum for pivotal movement about the fulcrum axis; first point on said scale beam arranged to sense the weight of an article being graded; a biasing spring having one end connected to a second point on said beam to exert a force tending to counteract the force exerted by the weight of said article being graded, the other end of said spring being connected to an adjustment head; said adjustment head being movable along an adjustment shaft, said adjustment shaft extending in a direction parallel to and along at least a substantial part of the axis of said spring.

Preferably said first point on said scale beam is on one side of said fulcrum and said second point is on the opposite side of said fulcrum.

Preferably said scale beam is a frame, said first point comprises an upstanding frame end which in use is arranged to provide a surface upon which an article being graded or means associated therewith may bear to exert a component of weight upon the scale beam and said second point comprises the other end of said scale beam which projects beyond the fulcrum and which is folded down substantially at right angles to the main part of the frame whereby said second point on said scale beam is located almost immediately below said fulcrum.

Preferably the scale beam is a horizontally arranged substantially right angled Z-shape with said fulcrum towards the down turned end of said "Z" and with said biasing spring and adjustment means parallel or substantially parallel to the main or centre part of said scale beam.

Preferably in a multi-lane grader the adjustment head is capable of independent adjustment for each spring and ganged adjustment for the connected scale assembly across the multi-laned machine.

Preferably the material selected for the biasing spring and the adjustment shaft is such that thermal expansion in the shaft will compensate for the change of characteristics in the spring at varying ambient temperatures likely to be experienced in operation, thereby providing a self-compensating arrangement which will not move significantly out of adjustment due to changes in normal operating conditions.

The weight grading apparatus of this invention may be used in a multi-laned fruit sorting machine such as that described in New Zealand Patent specification 124,415.

BRIEF DESCRIPTION OF THE DRAWINGS

One preferred form of the invention will now be described with reference to the drawings in which.

DESCRIPTION OF THE PREFERRED EMBODIMENTS

Figure 1:
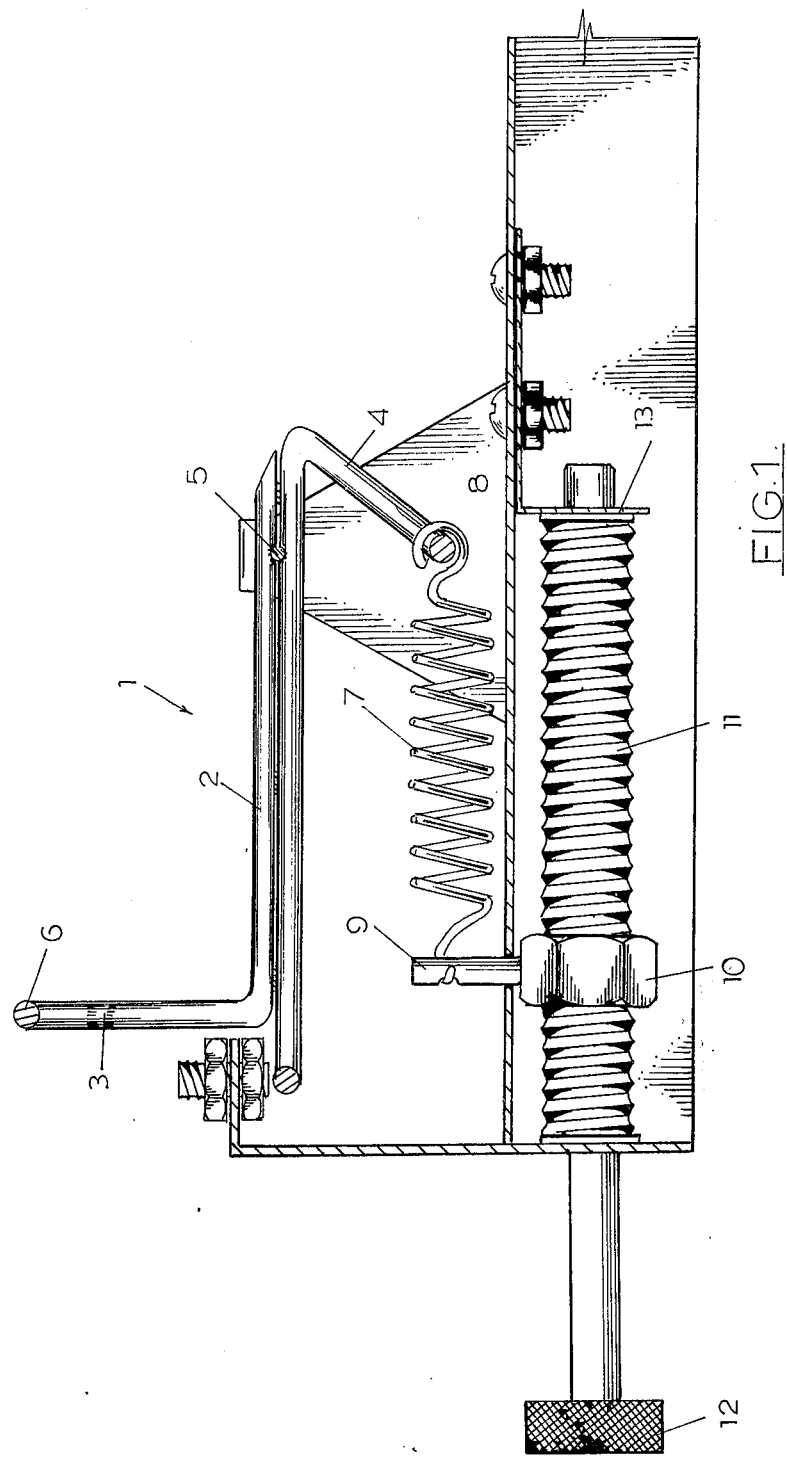
FIG. 1 is a partly diagrammatic sectional side elevation of the scale assembly according to the present invention.

In its simplest form the scale assembly 1 comprises a scale beam 2, for example a wire frame substantially rectangular in overall outline or in plan view, having one end 3 upstanding and the opposite end 4 turned down in the opposite direction. The scale beam is pivotally supported on a fulcrum 5 which has the ends pivotally located in slots in the frame supporting the assembly. The top 6 of the upturned end 3 provides the bearing surface upon which a pin associated with a cup carrying a piece of fruit or other article to be weight graded may be engaged. A component of weight is thus exerted on the surface 6. A compensating adjustable spring 7 has one end connected to the mid-point of the transverse bar 8 on the downturned section 4. The point of connection at 8 is preferably located below the fulcrum 5 and as close to the fulcrum as can reasonably be achieved. The opposite end of the spring 7 is connected to a pillar 9 fixed to a nut 10 movable along a threaded shaft 11 controlled by a control knob 12. Thus, by rotating the control knob 12 the tension in the spring 7 may be varied, setting the device to achieve the desired grading when the component of weight exerted on 6 reaches the predetermined value.

The depression of the member 6 when the load thereon exceeds a predetermined weight limit causes the cup carrying the fruit to be directed down a guided path so that the fruit therein will be discharged and conveyed to collecting bins in a manner similar to that achieved with existing apparatus such as that described in New Zealand Patent specification 124,415.

The arrangement of the present invention has the adjustment shaft 11 parallel to and immediately below the spring 7. Thus, changes in ambient temperature causing the characteristic of the spring to alter will also cause the length of the member 11 to alter between the abutment face 13 and the nut 10. In this way, the device has a self-compensating factor incorporated therein which will ensure operation over a range of conditions normally experienced during use. This self-compensating phenomenon is achieved using ordinary material but can be improved if the material selected has characteristics which will more closely match one another in the range of temperatures which will be experienced during use.

The preferred embodiment of the invention has initially been described in its simplest form but it will be appreciated that modifications, even from this simple form, can be achieved without departing from the main principle of the invention. For example, the simple lever arrangement could be changed with the spring acting on a compound lever system. This would not have the same advantage from a manufacturing point of view but could still allow the invention to be employed. Also, while there is merit in providing the point of contact between the spring and the scale beam immediately below the fulcrum this is not necessarily an essential requirement. An arrangement could be provided whereby the point of contact was in line with the main body of the scale beam and the spring and adjustment shaft inclined at an angle. Once again, from a manufacturing point of view construction is not as attractive as the preferred embodiment illustrated in FIG. 1.

Figure 2:
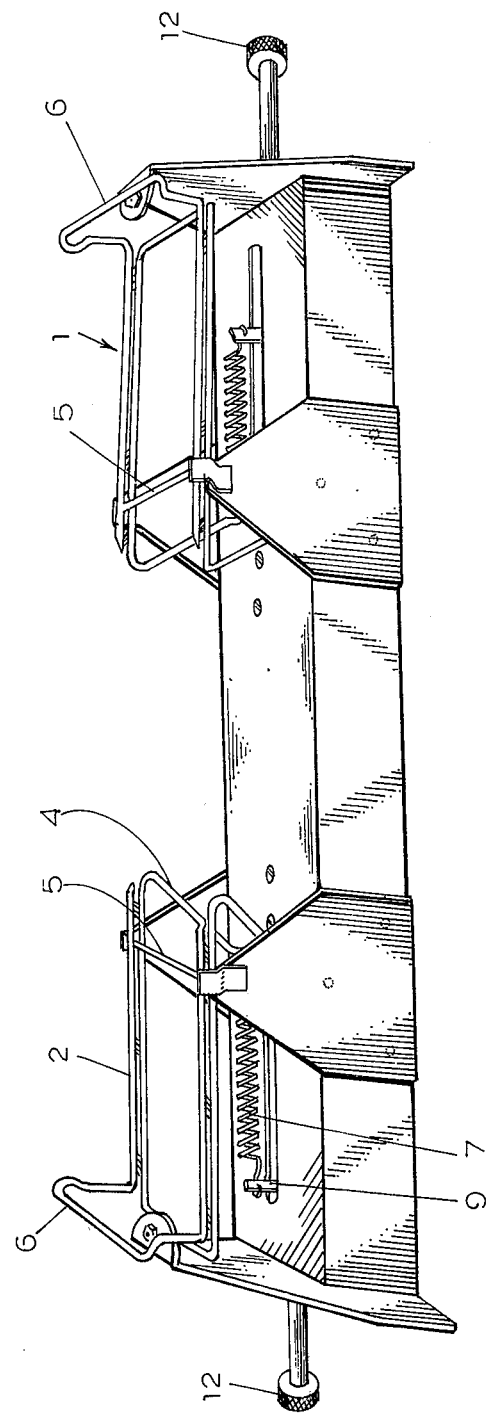
FIG. 2 is a perspective sketch of a two-lane assembly.

The scale assembly as above described would be incorporated in a sub-frame of a grading machine in its simplest form in the arrangement illustrated in FIG. 2. This would provide a two-lane grader with units as described in FIG. 1 adjustable from either side of the machine.

This simple arrangement will require modification where more than two lanes are employed and in fact even with a two-lane grader the same type of adjustment as will be described herein below is possible.

The primary adjustment cog is deliberately made large so that it is readily accessible from the top and enables the easy individual adjustment as above referred to. A relatively small cog is used on the adjustment shaft and because of the gearing ratio so achieved it is possible to have a comparatively fine calibration in the adjustment. In the multi-lane assembly the stop for the adjustment head or nut 10 projects downwardly and by virtue of a bifurcated end spans the common adjustment shaft. Because of this means of connection it is possible to avoid any binding which might be occasioned if the adjustable head were restrained by rotation by a pin or other means engagable through a slot in the frame.

What I claim is:

1. A weight grading apparatus including a scale assembly comprising: a fulcrum; a scale beam supported upon said fulcrum for pivotal movement about the fulcrum axis; a first point on said scale beam on one side of said fulcrum arranged to sense the weight of an article being graded; a biasing spring having one end connected to a second point on said scale beam on the opposite side of said fulcrum to exert a force tending to counteract the force exerted by the weight of said article being graded, the other end of said spring being connected to an adjustment head; said adjustment head being movable along an adjustment shaft, said adjustment shaft extending in a direction parallel to and at least along a substantial part of the axis of said spring.

2. Apparatus according to claim 1 wherein the materials selected for said biasing spring and said adjustment shaft are such that thermal expansion in said shaft will compensate for any change of characteristics in said spring at varying ambient temperatures likely to be experienced in operation, thereby providing a self compensating arrangement which will not move significantly out of adjustment due to changes in normal operating conditions.

3. The apparatus according to claim 1 wherein said scale beam is a frame, said first point comprises an upstanding frame end which in use is arranged to provide a surface upon which an article being graded or means associated therewith may bear to exert a component of weight upon the scale beam and said second point comprises the other end of said scale beam which projects beyond the fulcrum and is folded down substantially at right angles to the main part of the frame whereby said second point on said scale beam is located almost immediately below said fulcrum.

4. The apparatus according to claim 3 wherein said scale beam has a horizontally arranged substantially right angled Z-shape, said fulcrum being towards the down turned end of said "Z" and the axis of said biasing spring and the shaft of said adjustment means being substantially parallel to the main or central part of said scale beam.

* * * * *